US006121585A

United States Patent [19]

Dam

[11] Patent Number: 6,121,585

[45] Date of Patent: Sep. 19, 2000

[54] ELECTRICALLY HEATED BEVERAGE CUP AND CUPHOLDER SYSTEM

[75] Inventor: Robert Dam, 2215 Chesire Dr., Aurora, Ill. 60504

[73] Assignee: Robert Dam, Aurora, Ill.

[21] Appl. No.: 09/281,194

[22] Filed: Mar. 30, 1999

[51] Int. Cl.[7] .................... F27D 11/00

[52] U.S. Cl. .................... 219/438; 219/385; 219/386

[58] Field of Search .................... 219/432, 433, 219/434, 435, 436, 541, 521, 505; 392/444

[56] References Cited

U.S. PATENT DOCUMENTS

| | | | |
|---|---|---|---|
| 3,915,079 | 10/1975 | Balderson | 99/281 |
| 4,095,090 | 6/1978 | Pianezza | 219/441 |
| 4,341,949 | 7/1982 | Steiner et al. | 219/553 |
| 4,463,664 | 8/1984 | Peace | 99/323.3 |
| 4,523,083 | 6/1985 | Hamilton | 219/433 |
| 4,700,050 | 10/1987 | Hennuy et al. | 219/438 |
| 4,722,853 | 2/1988 | Batliwalla et al. | 427/256 |
| 4,801,782 | 1/1989 | Ineson | 219/438 |
| 4,812,623 | 3/1989 | Haden et al. | 219/437 |
| 4,857,711 | 8/1989 | Watts | 219/548 |
| 4,922,083 | 5/1990 | Springs et al. | 219/549 |
| 4,931,627 | 6/1990 | Watts | 219/548 |
| 4,959,528 | 9/1990 | Malloy | 219/432 |
| 4,959,632 | 9/1990 | Uchida | 338/22 R |
| 5,181,006 | 1/1993 | Shafe et al. | 338/22 R |
| 5,243,684 | 9/1993 | Edwards | 392/444 |
| 5,283,420 | 2/1994 | Montalto | 219/432 |
| 5,400,700 | 3/1995 | Bois | 99/403 |
| 5,508,494 | 4/1996 | Sarris et al. | 219/386 |
| 5,773,795 | 6/1998 | Messmer | 219/441 |
| 5,837,164 | 11/1998 | Zhao | 252/500 |
| 5,842,353 | 12/1998 | Kuo-Liang | 62/190 |

*Primary Examiner*—Teresa Walberg
*Assistant Examiner*—Vinod D Patel
*Attorney, Agent, or Firm*—D'Ancona & Pflaum LLC

[57] ABSTRACT

A beverage cup and cupholder system made in accordance with the principles of the present invention includes a beverage cup 10 and a cupholder 50. The beverage cup 10 includes a sleeve 13, a liner 19, and a base 20. The base 20 includes an O-ring 22, a plate 23, a heating element 27 and spring terminals **28*a*, 28*b*. The heating element preferably exhibits a variable PTC effect. The base further includes a contact ring 25 and a contact disk 29. The cupholder 50 is adapted to mate with the base 20 of the beverage cup 10. Preferably, the cupholder 50 has recessed land areas 57, 58 which lie below a plane of support 53 for the beverage cup 50. The recessed land areas 57, 58 are electrically isolated from each other. The cupholder includes spring contacts 52, 54 which are adapted to receive connections from an external source of electrical current. The spring contacts 52, 54 extend into the recessed land areas 57, 58. The beverage cup 10, when filled with a hot beverage, is placed into the cupholder 50. As the beverage cup 10 is placed into the cupholder 50, the contact disk 29 and contact ring 25 automatically align with the recessed land areas 57, 58 and make contact with the spring contacts 52, 54. The use of a heating element 27** having a PTC effect maintains a beverage at a desirable equilibrium temperature for an extended period of time.

43 Claims, 3 Drawing Sheets

18
19
13
10
20
22
23
25
28a,28b
29
27
19
13
17
23
27
22
28a,27b
20
29
25

25
22
29
23
28a
27
28b
20

28a
20
25
29
23
27
28b 73
50
52
54

ELECTRICALLY HEATED BEVERAGE CUP AND CUPHOLDER SYSTEM

FIELD OF THE INVENTION

This invention relates to an electrically heated beverage cup and cupholder system whereby liquids, such as beverages, may be controllably heated to, or maintained at, a desired temperature.

BACKGROUND OF THE INVENTION

The use of devices for heating and maintaining liquids at a desired temperature is known in the art. These devices typically include a container for containment of the liquid, insulation to limit the rate of heat loss from a heated liquid, a cupholder to hold the container, and a heater to heat the container. Generally, the prior art devices utilize a continuous heater which may be manually turned on or off to provide heat to the liquid in the container. Alternately, the prior art devices utilize a thermostat or a thermal-switch, such as a thermistor, to automatically switch off the heater when a predetermined temperature is reached on the surface of the container or on the surface of the heater. Such heaters include resistance-type heating elements and ceramic positive temperature coefficient ("PTC") materials. These prior art devices typically operate in an on or off mode with respect to heating the container that is independent of the amount of liquid in the container.

One prior art device attempts to compensate for the amount of liquid in the container. Such a device uses a spring-biased switch. As the amount of liquid in the container is decreased the spring-biased switch moves to an open position. When there is too little liquid weight in the container to retain the spring-biased switch in a closed position, the switch opens and the heater is switched off. Here too, the prior art device operates in an on or off mode with respect to the heater although the operation of the heater relates to the volume of liquid.

Some prior art devices rely on exposed heaters in a holder or exposed switches which activate the heater. In one prior art device, the container is place directly on an exposed heating plate located in the holder. In another prior art device, although the heater is contained within the insulation surrounding the container, the switches that activate the heater are exposed. Other prior art devices require the cup to be positioned in a specific orientation with respect to the cupholder so that an electrical connection can be made. Yet other prior art devices require the use of an external power cord to connect a source of electrical power to the cupholder.

Each of these prior art devices has certain disadvantages. Some of these devices require manual on and off operation to control the temperature of the liquid contained in the cup. Other devices must rely on thermostats or thermistors to turn off the power to the heaters. The use of exposed heaters or switches can also be a disadvantage.

The reliance on a manual operation of the heater can result in situations where the operator of such devices forgets to turn off the heater. This can result in overheating of a liquid and further result in harm to the operator. The reliance on thermostats and thermistors requires that these extra devices function properly, otherwise overheating of the liquid can occur, or the device will fail to operate at all. Also, the use of exposed heaters, or switches that activate the heater, can lead to short-circuiting of the device if the liquid is accidentally spilled on the heater or switches. The use of an exposed heater may pose a burn hazard to a user of such a device. The use of exposed heaters and/or switches also limits the type of container which may be placed in the holder. An aluminum can, for example, could short out the heater. Also, the contents of the aluminum can could be heated and overheated on an exposed heating means.

What would therefore be an advantage would be an electrically heated beverage cup and cupholder system that did not rely on manual control of the heater. It would be an advantage to have an electrically heated beverage cup and cupholder system which also did not rely on extra components such as thermostats or thermistors. It would be a further advantage to have an electrically heated beverage cup and cupholder system which provided protection against accidental spills of liquids. It would also be an advantage to have an electrically heated beverage cup and cupholder system that did not require a specific orientation of the beverage cup in the cupholder. It would be a further advantage to have a cupholder that did not require the use of an external power cord. It would be yet a further advantage to have a cupholder that allowed the placement of any properly sized container into the holder without causing problems to the operation of the electrically heated beverage cup or cupholder system.

SUMMARY OF THE INVENTION

The present invention provides an electrically heated beverage cup and cupholder system that does not rely on manual operation to control the amount of heat applied to the beverage cup. The present invention provides an electrically heated beverage cup and cupholder system that also does not rely on extra components such as thermostats or thermistors. The present invention provides an electrically heated beverage cup and cupholder system that provides protection against accidental spills of liquids. The present invention provides an electrically heated beverage cup and cupholder system that does not require that the beverage cup be specifically oriented in the cupholder in order for the making of an electrical connection. The present invention also provides in one embodiment an electrically heated beverage cup and cupholder system that does not require the use of an external power cord. The present invention further provides a cupholder that allows the placement of any properly sized container into the cupholder without causing problems to the operation of the electrically heated beverage cup or cupholder system.

The present invention provides a beverage cup for electrically heating a beverage, which includes a cup for providing containment of the beverage; an electrical heating element disposed in the cup, and a polymeric PTC material disposed in the electrical heating element. When an electrical current is applied to the electrical heating element the polymeric PTC material radiates heat for heating the beverage until a cut-off temperature is reached. The present invention also provides a cupholder for use with an electrically heatable beverage cup which includes a bottom for mating with the beverage cup; a plane of support for supporting the beverage cup; a first recessed land area disposed in the bottom, the first recessed land area lying in a plane that is below the plane of support; and a second recessed land area disposed in the bottom, the second recessed land area lying in a plane that is below the plane of support. The first recessed land area defines a first containment area and the second recessed land area each defines a second containment area, the containment areas providing for the containment of a spilled liquid. Each recessed land area includes an electrical spring contact, the electrical spring contacts providing electrical power to the beverage cup.

DETAILED DESCRIPTION OF THE INVENTION

Figure 1:
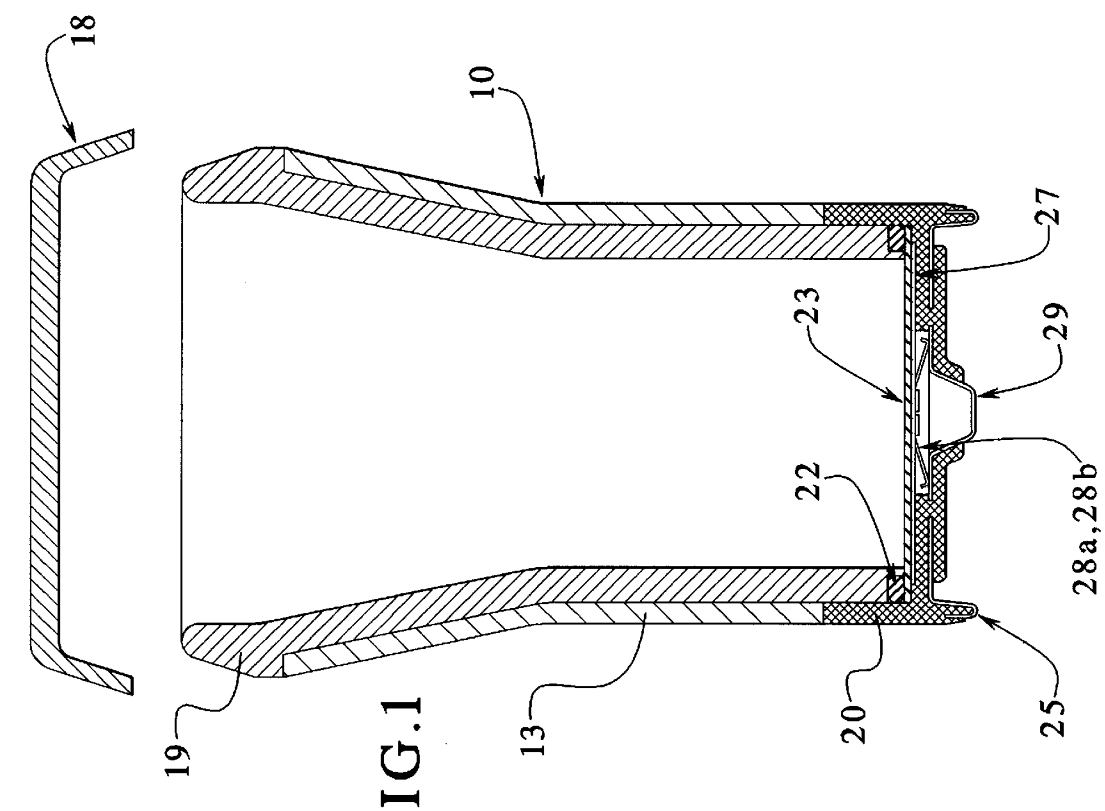
FIG. 1 is an elevation cross-sectional view of an electrically heated beverage cup made in a accordance with the principles of the present invention.
Figure 2:
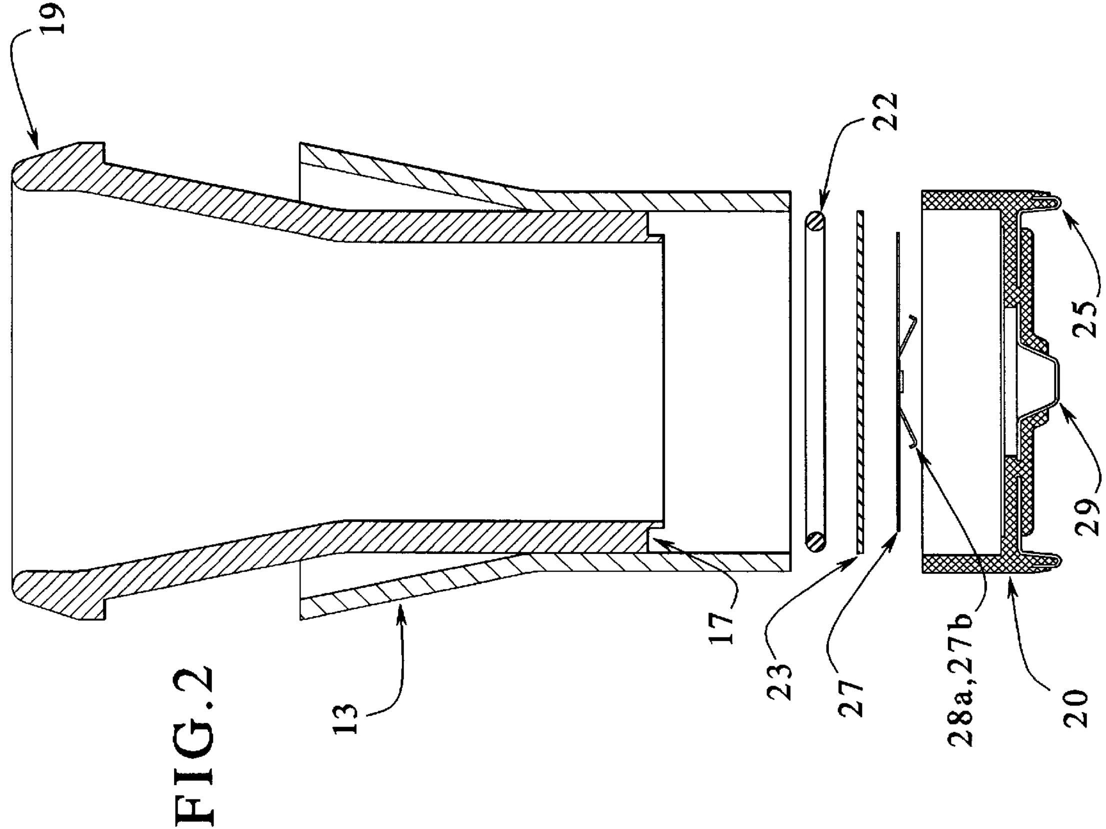
FIG. 2 is an elevation cross-sectional view of the components of the electrically heated beverage cup of FIG. 1.
Figure 3:
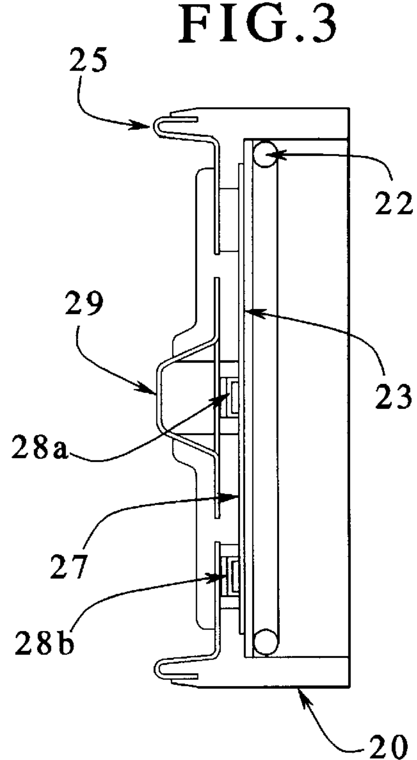
FIG. 3 is an elevation cross-sectional view of the components of the base of the electrically heated beverage cup of FIG. 1.
Figure 4:
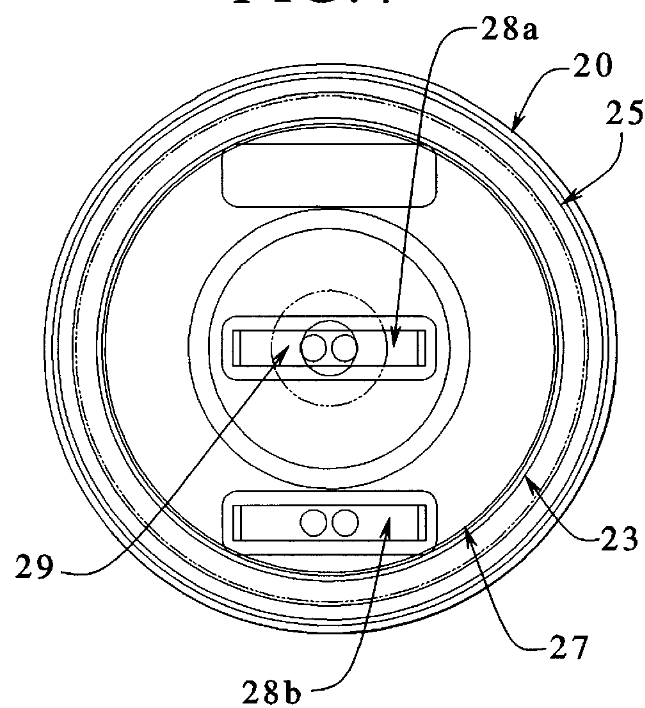
FIG. 4 is a plan cross-sectional view of the components of the base of the electrically heated beverage cup of FIG. 1.

Referring to FIG. 1, a cup for electrically heating a beverage made in accordance with the principles of the present invention is designated by 10. The electrically heated beverage cup 10 includes a sleeve 13 and a base 20. The sleeve 13 may be an insulating sleeve. A liner 19 is disposed in the sleeve 13. A lid 18 is provided which is removably positioned on the liner 19 and serves to further contain liquids within the beverage cup 10.

The base 20 includes an O-ring 22, a plate 23, an electrical heating element 27 and at least two spring terminals 28*a* and 28*b*. The base 20 has an inside diameter adapted to frictionally engage the outside diameter of the liner 19. The O-ring 22, the plate 23, the heating element 27 and the spring terminals 28*a* and 28*b* are disposed in cavities formed in the base 20. The liner 19 is adapted to compress the O-ring 22 against the plate 23. In one embodiment, the liner 19 defines a groove 17 at the distal end of the liner 19 such that the O-ring 22 is retained in the groove 17. The base 20 further includes a contact ring, also referred to as a first contact, 25 and a contact disk, also referred to as a second contact, 29. The function and operation of each of these elements is described in detail below.

The liner 19 defines a cylinder and has openings at its distal and proximal ends. The liner 19 is preferably made from a thermoplastic or thermoset plastic material which is selected to withstand both the physical stresses and resist the temperatures which occur in an electrically heated beverage cup and cupholder system. The plastic material may be further filled with any fillers in the art such as carbon, glass, or other appropriate filler.

The O-ring 22 is preferably selected from compressible and resilient materials which are known in the art to provide liquid seals when compressed. Therefore, the O-ring 22 may be selected from materials which include buna-N rubber, natural rubber, silicone, polyvinyl chloride, and thermoplastic elastomers.

The base 20 is also preferably made from a thermoplastic or thermoset plastic material which is selected to withstand both the physical stresses and resist the temperatures which occur in an electrically heated beverage cup and cupholder system. The plastic material may be further filled with any fillers in the art such as carbon, glass, or other appropriate filler.

The liner 19 is attached to the base 20 and the O-ring 22 is held in a compressed position. The liner 19 may be attached to the base 20 by any means known in the art for making such attachments. Attachment means include ultrasonic welding, solvent bonding, and the use of an adhesive or glue. With the attachment of the liner 19 to the base 20, the O-ring 22 is compressed to form a liquid seal. Thus a cup is formed which is adapted to hold a liquid, such as a beverage.

The heating element 27 is made from a PTC (positive temperature coefficient) material. The heating element 27 is a flexible component which ranges in thickness from about 0.005 to about 0.02 inches, and is preferably about 0.008 to about 0.012 inches in thickness. In the preferred embodiment, the heating element 27 is circular in shape and is made slightly smaller in diameter than the plate 23 which is also preferably circular in shape. The heating element 27 is made by screen printing a circuit of carbon-based polymeric PTC thick film resistors onto a thin substrate. The thin substrate may be made from a plastic material.

Electrical devices comprising conductive polymeric compositions that exhibit a positive temperature coefficient (PTC) effect may be adapted for use in the present invention. A typical conductive polymeric PTC composition comprises a matrix of a crystalline or semi-crystalline thermoplastic resin (e.g., polyethylene) or an amorphous thermoset resin (e.g., epoxy resin) containing a dispersion of a conductive filler, such as carbon black, graphite chopped fibers, nickel particles or silver flakes. Some compositions additionally contain non-conductive fillers, such as metal oxides, flame retardants, stabilizers, antioxidants, antiozonants, crosslinking agents and dispersing agents.

At a low temperature (e.g. room temperature), the polymeric PTC composition has a compact structure and resistivity property that provides low resistance to the passage of an electrical current. However, when a PTC device that includes the composition is heated or a current causes the device to self-heat to a transition temperature, a less ordered polymer structure resulting from a large thermal expansion presents a high resistivity. In electrical PTC devices, for example, this high resistivity limits the flow of electric current, leading to near-zero current flow through the circuit. Thus, at a cut-off temperature, the flow of electric current is virtually shut off.

In the preparation of the conductive PTC polymeric compositions, the processing temperature often exceeds the melting point of the polymer by 20° C. (68° F.) or more, with the result that the polymers may undergo some decomposition or oxidation during the forming process. In addition, some devices exhibit thermal instability at high temperatures and/or high voltages that may result in aging of the polymer. Thus, inorganic fillers and/or antioxidants, etc. may be employed to provide thermal stability.

High temperature polymeric PTC materials such as polyethylene, homopolymers and copolymers of poly (tetrafluorethylene), poly(hexafluoropropylene) and poly (vinylidene fluoride) (PVDF) or their copolymers and terpolymers with, for example, ethylene or perfluorinated-butyl ethylene, may be adapted for use in the present invention. A variety of other polymers possessing PTC characteristics may also be used. These polymers include polypropylene, polyvinylchloride, polybutylene, polystyrene, polyamides (such as nylon 6, nylon 8, nylon 6,6, nylon 6,10 and nylon 11), polyacetal, polycarbonate and thermoplastic polyesters, such as poly(butylene terephthalate) and poly(ethylene terephthalate). A high temperature polymeric PTC composition comprising a polymer matrix of an amorphous thermoplastic resin (crystallinity less than 15%) and a thermosetting resin (e.g. epoxy) may also be adapted for use in the present invention.

The PTC material in the preferred embodiment is a screen printable electrically conductive paste, also known as a PTC resistor paste, having a composition adjusted to have a desired electrical characteristic. A preferred screen printable PTC material includes an ethylene vinyl acetate co-polymer resin, such as DUPONT 265 (available from E.I. DuPont de Nemours and Company, Wilmington, Del.). DUPONT 265 includes 28 percent vinyl acetate monomer and 72 percent ethylene monomer modified to have a resistivity of 15,000 ohms per square centimeter. To achieve this electrical characteristic, the ethylene vinyl acetate co-polymer resin is first dissolved in an aromatic hydrocarbon solvent to about a 20 percent by weight solids composition. The aromatic hydrocarbon solvent may be selected from solvents which include naphtha, xylene, and toluene. Carbon black, such as CABOT VULCAN PF (available from Cabot Corporation, Boston, Mass.) is then added to achieve a solids composition of about 50 percent by weight. The composition thus formed is mixed to thoroughly disperse the solids in the solvent. The final PTC material is prepared by further diluting the dispersed mixture prepared above with the solvent until the desired resistivity is achieved. The solids composition of the final PTC material will be about 20 percent by weight.

The substrate includes an electrically insulating plastic, such as MYLAR (available from E.I. du Pont de Nemours and Company, Wilmington, Del.), or polyester, polycarbonate, or polyetherimide, on which has been deposited an electrically conductive material, or ink, such as silver polymer 725 (available from Hunt Chemicals, Atlanta, Ga.). The electrically conductive material forms the bus system for the heating element 27. The bus system is preferably deposited on the electrically insulating plastic within the range of about 8 to about 10 microns in thickness. The bus system is deposited on one surface of the electrically insulating plastic to from a plurality of interdigitated electrodes. Means are provided to connect the bus system to an external electrical current source. Such connection means includes two separate and parallel bus bars which terminate in terminals 28*a*, 28*b*, to which the external electrical current source may be connected.

The PTC material is screen printed over the bus system in parallel spaced apart stripes perpendicular to the interdigitated electrode pattern. The PTC material is preferably printed to a thickness of from about 2.5 to about 5 microns. Thus is formed the heating element 27 which includes a plurality of individual heating areas, or resistors, on the electrically insulating substrate. A process for manufacturing such a heating element is disclosed in U.S. Pat. No. 4,857,711, the description of which is incorporated herein.

The PTC material and the heating element 27 thus formed exhibit a variable PTC effect. Such heating elements undergo a large, abrupt increase in their electrical resistance when heated above a certain temperature referred to as the transition temperature or cut-off temperature. The higher resistance inhibits the flow of electrical current and thus, inhibits the generation of heat by the heating element 27. As the temperature gradually drops through cooling, the resistance decreases and more current can flow through the heating element 27 thus generating more heat. The increased flow of current causes the resistors to heat beyond their transition temperature and the cycle repeats itself. The result is a heating element 27 that stabilizes at a predetermined equilibrium temperature without the aid of extra controls such as thermostats or thermistors. In the preferred embodiment, the equilibrium temperature ranges from about 120° to about 180° F., and preferably from about 145° to about 155° F.

The heating element 27 not only controls the equilibrium temperature, but it also is sensitive to the amount of liquid in the beverage cup 10. This occurs because the rate of heat dissipation away from the heating element 27 is dependent, in part, on the thermal mass surrounding the heating element 27. This thermal mass includes the mass of liquid in the beverage cup 10.

The heating element 27 is disposed on the plate 23. The preferred method of attaching the heating element 27 to the plate 23 is to use a pressure sensitive adhesive to make such an attachment. However, other methods known in the art may be used. The material from which the plate 23 is made is selected to provide good thermal conductivity. Preferably the plate 23 is made from stainless steel.

The spring terminals 28*a*, 28*b* are both physically attached to the heating element 27 and electrically connected to the buss system of the heating element. The spring terminals 28*a*, 28*b* may be riveted or eyeletted to the heating element 27, but other suitable connection means may be used.

The base 20 further includes a contact ring 25 and a contact disk 29. The contact disk 29 is disposed in the center of the base 20. The contact ring 25 is disposed in the circumference of the base 20. Both the contact disk 29 and contact ring 25 may be molded in place; however, other suitable attachment means may be used. Within the interior of the base 20, the contact ring 25 and contact disk 29 are adapted to make contact with the spring terminals 28*a*, 28*b* when the beverage cup 10 is fully assembled as described above. The base 20, the contact ring 25, and the contact disk 29 are also adapted to make contact with a cupholder 50 from the exterior of base 20.

A cupholder 50 is adapted to mate with the base 20 of the beverage cup 10. In the preferred embodiment, the cupholder 50 is cylindrical in shape and has an inner diameter which is slightly greater than the outer diameter of the base 20 of the beverage cup 10. The cupholder 50 has a depth measured interiorly from the top edge 51 of the cupholder 50 to a plane of support 53 for the beverage cup 10. The depth of the cupholder 50 may vary from effectively zero depth to a depth equal to the height of the beverage cup 10. While the depth may vary, a greater depth provides more stability to the beverage cup 10 when the beverage cup 10 is positioned in the cupholder 50.

The bottom of the cupholder 50 has a first recessed land area 57 and a second recessed land area 58. The recessed land areas 57, 58 each lie in planes which are below the plane of support 53. The recessed land area 57 may lie in a different plane than the recessed land area 58. The difference in elevation between the recessed land areas 57, 58 and the plane of support 53 is in the range of about 0.125 to about 0.500 inches and preferably in the range of about 0.200 to about 0.300 inches. The first recessed land area 57 is constrained on one side by the interior wall of the cupholder 50. The recessed land area 57 has a width in the range of about 0.125 to about 0.500 inches and preferably in the range of about 0.250 to about 0.350 inches. The second recessed land area 58 is approximately concentric with the interior wall of the cupholder 50 and is located in the center of the bottom of the cupholder 50. The second recessed land area 58 has a diameter in the range of about 0.400 to about 0.800 inches and preferably in the range of about 0.500 to about 0.700 inches. Thus, each recessed land area 57, 58 defines a containment area for containing a spilled liquid.

The cupholder 50 is adapted to receive the spring contacts 52, 54. The spring contacts 52, 54 are located on the exterior bottom of the cupholder 50 and extend through the exterior bottom into the recessed land areas 57, 58. The spring contacts 52, 54 are adapted to receive connections to a source of electric current. The spring contacts 52, 54, although extending into the recessed land areas 57, 58, do not extend above the plane of support 53. Therefore, the spring contacts 52, 54 are electrically isolated from each other in the event of an accidental spill of liquid into the cupholder 50 that is retained in the recessed land areas 57, 58.

The beverage cup 10, when filled with a hot beverage, is placed into the cupholder 50. The bottom of the beverage cup 10 is designed to mate with the recessed land areas of the cupholder 50 such that there is no specific angular orientation required in order to make electrical contact between the beverage cup 10 and the cupholder 50. This is accomplished by providing concentric recessed land areas 57, 58 that include the spring contacts 52, 54. As the beverage cup 10 is placed into the cupholder 50, the contact disk 29 and contact ring 25 align with the recessed land areas 57, 58 of the cupholder 50. When the beverage cup 10 is at rest on the plane of support 53, the contacts of the beverage cup 10 engage the contacts of the cupholder 50. The contact disk 29 engages the spring contact 54. The contact ring 25 engages the spring contact 52. With a source of electrical current connected to the spring contacts 52, 54, the electrical current may flow to the contact disk 29 and the contact ring 25. The electrical current flows from the spring contact 54 to the contact disk 29 into the spring terminal **28*a* and then into the heating element 27. The electrical current may then flow through the heating element 27 out the spring terminal 28*b* then through the contact ring 25 through the spring contact 52** and back to the source of the electrical current, thus completing a circuit.

Initially, when the beverage in the beverage cup 10 is very hot, there is very little current flow through the heating element 27. This is due to the nature of the PTC material used in the heating element 27, as described above. By heat transfer from the beverage cup 10, the heating element 27 is heated beyond the transition temperature for the PTC material. Thus the electrical resistance of the heating element 27 is increased to the point that there is only minimal flow of electrical current through the heating element 27. As the beverage in the beverage cup 10 cools, the temperature of the heating element 27 decreases accordingly and eventually falls below the transition temperature of the PTC material. At this point the electrical resistance of the heating element 27 drops and the flow of electrical current through the heating element 27 increases. The flow of current through the resistors of the heating element 27 generates heat which is transferred to the beverage in the beverage cup 10. As the temperature of the heating element 27 once again increases above the transition temperature for the PTC material in the heating element 27, the electrical resistance of the heating element 27 is increased to the point that there is only minimal flow of electrical current through the heating element 27. This cycle is repeated so long as there is flow of electrical current through the heating element 27. The result is a beverage whose temperature is maintained at a desirable equilibrium temperature for an extended period of time.

Figure 7:
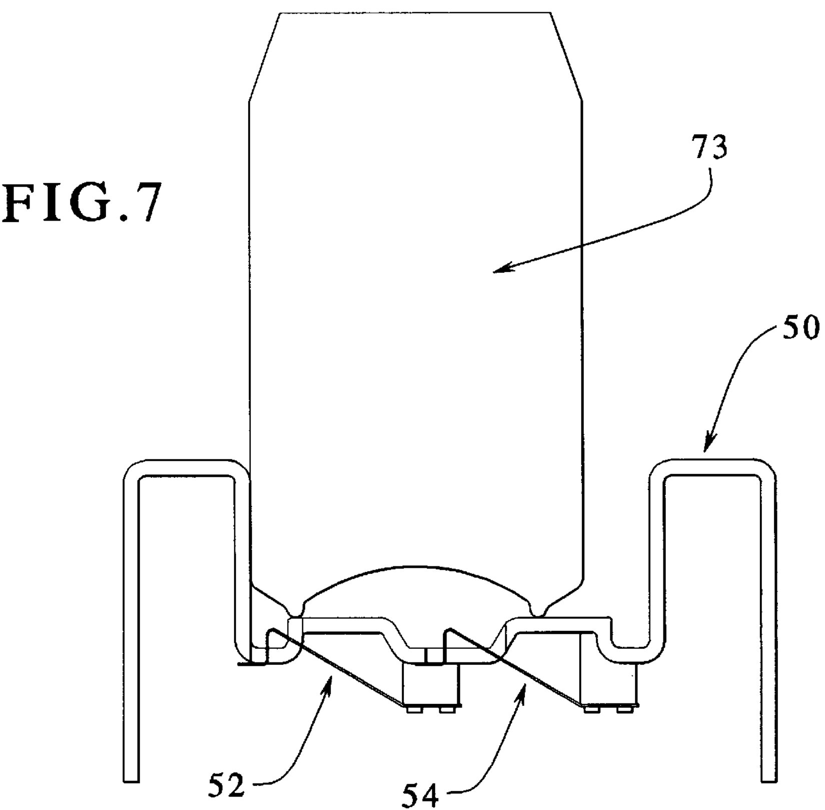
FIG. 7 is an elevation cross-sectional view of the cupholder system of the present invention.
Figure 6:
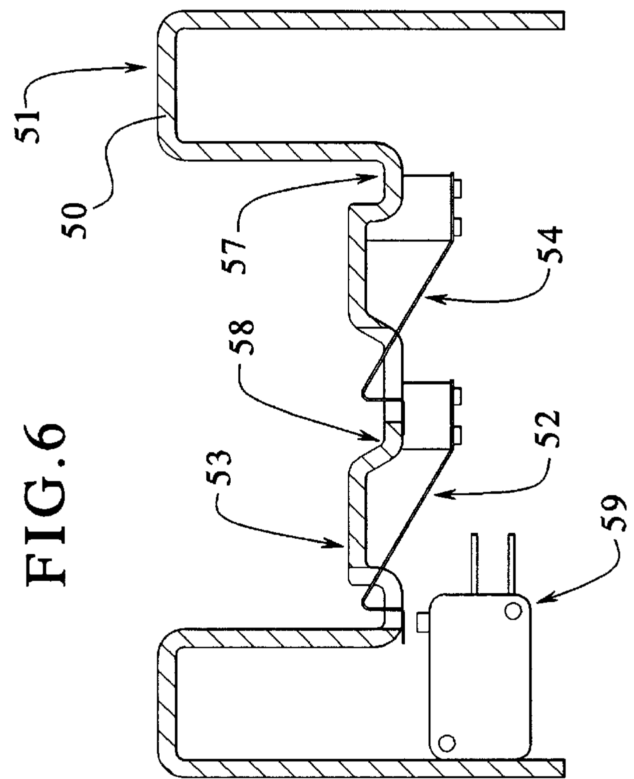
FIG. 6 is an elevation cross-sectional view of an embodiment of the electrically heated cupholder of the present invention.
Figure 5:
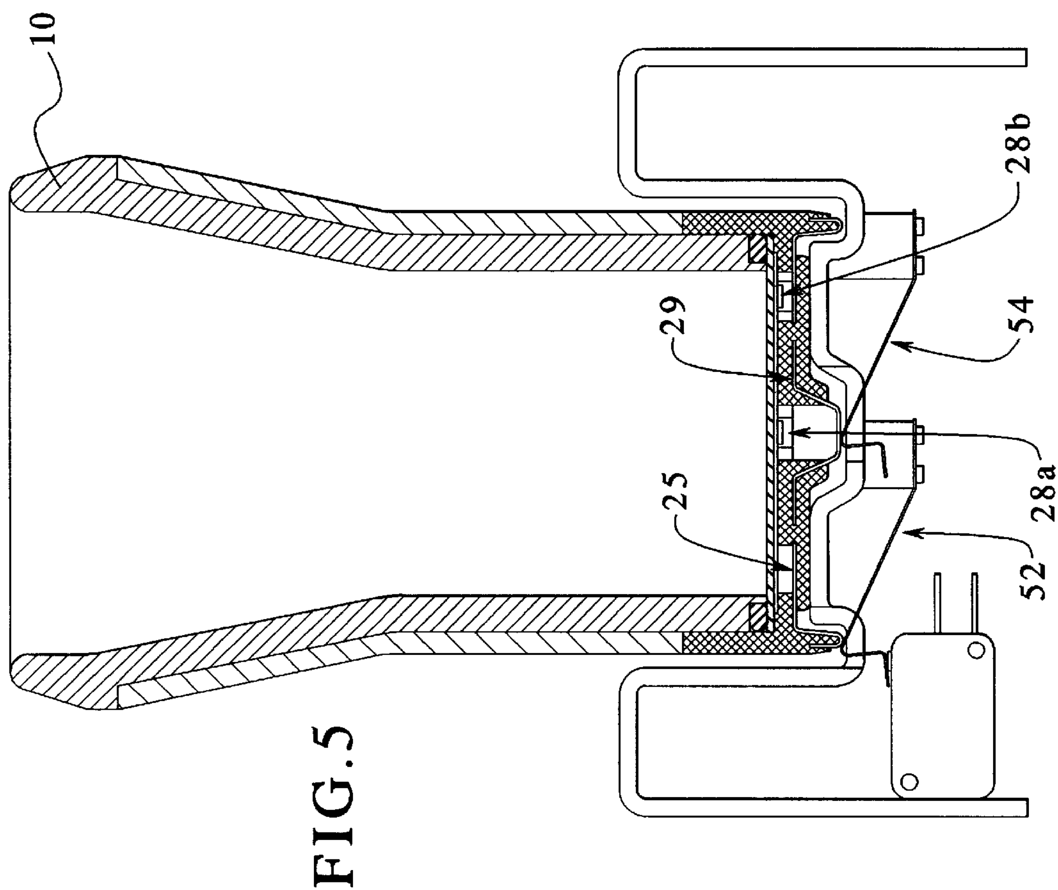
FIG. 5 is an elevation cross-sectional view of an embodiment of the electrically heated beverage cup and cupholder of the present invention.

The configuration of the cupholder 50 is also designed to accommodate metal beverage containers such as aluminum soda pop cans. The configuration of the cupholder 50 is also designed to accommodate flat-bottomed cups that may be electrically conductive. As illustrated in FIG. 7, the design of the cupholder 50 prevents the metal beverage can 73 from shorting spring contacts 52, 54.

An optional interlock switch 59 may be adapted to be automatically activated by spring contact 52 when the beverage cup 10 is positioned in the cupholder 50. The provision of the optional interlock switch 59 is an additional safety feature that requires the beverage cup 10 to be fully seated in the cupholder 50 before an electrical current can flow from the cupholder 50 to the beverage cup 10. The optional interlock switch 59 when in an open position interrupts the supply of electrical current to spring contacts 52, 54. When the beverage cup 10 is positioned in the cupholder 50, spring contact 52 closes the optional interlock switch 59 and electrical current may then flow from the source of electrical current to the spring contacts 52, 54.

While a cylindrical shape has been described for the beverage cup 10 and the cupholder 50, the present invention may be adapted to other shapes. Accordingly, a square beverage cup 10 and cupholder 50 made according to the principles of the present invention will possess the utility and advantages of the cylindrical beverage cup 10 and cupholder 50 described in the preferred embodiment. Therefore, the bottom of the beverage cup 10 includes a contact ring 25 concentrically positioned about a contact disk 29 so that the contact ring 25 engages the spring contact 52 and the contact disk 29 engages the spring contact 54 regardless of the angular orientation of the beverage cup 10 with respect to the cupholder 50. Similarly, the present invention can be adapted to other shapes.

In the preferred embodiment, the source of electrical current is the 12 VDC supply in the electrical system of an automobile. Accordingly, it is preferred that the cupholder 50 be installed in an automobile as a built-in device. However, a portable cupholder 50 may be adapted with a plug suitable for plugging into a cigarette lighter socket. Alternately, a cupholder may be adapted for in-home use in which case the source of electrical current is household electrical current which preferably will be transformed to direct current by a suitable electric transformer.

Thus it has been disclosed in embodiments and the preferred embodiment of the present invention an electrically heated beverage cup and cupholder system whereby liquids, such as beverages, may be controllably heated to, or maintained at, a desired temperature. The present invention provides an electrically heated beverage cup and cupholder system that does not rely on manual operation to control the heating means. The present invention further provides an electrically heated beverage cup and cupholder system which also does not rely on extra components such as thermostats or thermistors. The present invention also provides an electrically heated beverage cup and cupholder system which provides protection against accidental spills of liquids. The present invention also provides an electrically heated beverage cup and cupholder system that does not require that the beverage cup be specifically oriented in the cupholder in order for the making of an electrical connection. The present invention also provides in one embodiment an electrically heated beverage cup and cupholder system that does not require the use of an external power cord. The present invention provides yet a further advantage of a cupholder that allows the placement of any properly sized container into the holder without causing problems to the operation of the electrically heated beverage cup or cupholder system.

It should be understood that various changes and modifications preferred in the embodiment described herein will be apparent to those skilled in the art. Such changes and modifications can be made without departing from the spirit and scope of the present invention and without demising the attendant advantages. It is therefore intended that such changes and modifications be covered by the appended claims.

What is claimed is:

1. A beverage cup for electrically heating a beverage using an electrical current, the beverage cup comprising:

a cup for providing containment of the beverage;

an electrical heating element disposed in the cup, the electric heating element comprised of a polymeric PTC material;

such that when the electrical current is applied to the electrical heating element the polymeric PTC material radiates heat for heating the beverage until a cut-off temperature is reached.

2. The beverage cup of claim 1 wherein the electrical heating element disposed in the cup is flexible.

3. The beverage cup of claim 1 wherein the cup further comprises a liner and a base.

4. The beverage cup of claim 3 wherein the liner is made from a thermoplastic material.

5. The beverage cup of claim 3 wherein the liner is made form a thermoset material.

6. The beverage cup of claim 4 wherein the thermoplastic material is a filled thermoplastic material.

7. The beverage cup of claim 5 wherein the thermoset material is a filled thermoset material.

8. The beverage cup of claim 3 wherein the liner is attached to the base using means for attachment selected from the group consisting of ultrasonic welding, solvent bonding, use of an adhesive, and combinations thereof.

9. The beverage cup of claim 1 wherein the polymeric PTC material defines an equilibrium temperature of from about 120° to about 180° F.

10. The beverage cup of claim 1 wherein the electrical heating element further comprises a screen printable PTC resistor paste, an electrically conductive ink forming a bus system connected to the PTC paste, and an electrically insulating plastic substrate in which the PTC paste and the electronically conductive ink is disposed.

11. The beverage cup of claim 10 wherein the screen printable PTC resistor paste comprises an ethylene vinyl acetate co-polymer resin, a carbon black, and a hydrocarbon solvent.

12. The beverage cup of claim 11 wherein the hydrocarbon solvent is selected from the group consisting of naphtha, xylene and toluene.

13. The beverage cup of claim 10 wherein the screen printable PTC resistor paste has a solids content of about 20 percent by weight.

14. The beverage cup of claim 10 wherein the electrically conductive ink is silver polymer 725.

15. The beverage cup of claim 10 wherein the electrically insulating plastic is selected from the group consisting of MYLAR, polyester, polycarbonate, polyetherimide, and combinations thereof.

16. The beverage cup of claim 1 further comprising a first contact and a second contact for providing electrical contact with a source of electrical current.

17. The beverage cup of claim 16 wherein the first contact and the second contact are internally connected to the electrical heating element.

18. A cupholder for use with an electrically heatable beverage cup, the cupholder comprising:

a concentric bottom for mating with the beverage cup;

a plane of support for supporting the beverage cup;

a first recessed land area disposed in the bottom, the first recessed land area lying in a plane that is below the plane of support; and a second recessed land area disposed in the bottom, the second recessed land area lying in a plane that is below the plane of support;

such that the first recessed land area defines a first containment area and the second recessed land area each defines a second containment area, the containment areas providing for the containment of a spilled liquid.

19. The cupholder of claim 18 wherein the bottom is made from a plastic material selected from the group consisting of a thermoplastic, a thermoset, and combinations thereof.

20. The cupholder of claim 19 wherein the plastic material is a filled plastic material.

21. The cupholder of claim 18 further comprising a first spring contact and a second spring contact, the first spring contact and the second spring contact connected to a source of electrical current.

22. The cupholder of claim 21 wherein the first spring contact is disposed in the first recessed land area and the second spring contact is disposed in the second recessed land are.

23. The cupholder of claim 22 wherein the first recessed land area and the second recessed land area prevent a flat-bottomed conductive container from shorting the first spring contact and the second spring contact.

24. The cupholder of claim 22 wherein the first recessed land area and the second recessed land area prevent a metal beverage can from shorting the first spring contact and the second spring contact.

25. A beverage cup and cupholder system for electrically heating a beverage using an electrical current, the system comprising:

a cup for providing containment of the beverage;

an electrical heating element disposed in the cup;

a first contact disposed in the cup;

a second contact disposed in the cup;

a cupholder bottom adapted to receive the cup;

a plane of support disposed in the cupholder bottom for supporting the cup;

a first recessed land area disposed in the cupholder bottom, the first recessed land area lying in a plane that is below the plane of support and adapted to receive the first contact;

a second recessed land area disposed in the cupholder bottom, the second recessed land area lying in a plane that is below the plane of support and adapted to receive the second contact;

a first spring contact disposed in the first recessed land area and adapted to contact the first contact of the cup; and a second spring contact disposed in the second recessed land area and adapted to contact the second contact of the cup;

wherein the electrical current flows from a source of electrical current to the first spring contact to the first contact of the cup into the electrical heating element through the electrical heating element out the second contact of the cup and through the second spring contact and back to the source of electrical current.

26. The system of claim 25 wherein the electrical heating element further comprises a polymeric PTC material disposed in the electrical heating element.

27. The system of claim 26 wherein the polymeric PTC material defines an equilibrium temperature of from about 120° to about 180° F.

28. The system of claim 26 wherein when the electrical current flows through the electrical heating element the polymeric PTC material radiates heat for heating the beverage until a cut-off temperature is reached.

29. The system of claim 25 wherein the cup further comprises a liner and a base.

30. The system of claim 29 wherein the liner is made from a plastic material selected from the group consisting of a thermoplastic, a thermoset, and combinations thereof.

31. The system of claim 30 wherein the plastic material is a filled plastic material.

32. The system of claim 31 wherein the liner is attached to the base using means for attachment selected from the group consisting of ultrasonic welding, solvent bonding, use of an adhesive, and combinations thereof.

33. The system of claim 25 further comprising an interlock switch.

34. The system of claim 33 where the interlock switch is a safety interlock switch that closes an electrical circuit and allows current to flow when the beverage cup is fully seated in the cupholder.

35. The system of claim 25 such that the first recessed land area defines a first containment area and the second recessed land area each defines a second containment area, the containment areas providing for the containment of a spilled liquid.

36. The system of claim 35 wherein the spilled liquid is prevented from electrically shorting the spring contacts.

37. The system of claim 25 wherein the bottom is made from a plastic material selected from the group consisting of a thermoplastic, a thermoset, and combinations thereof.

38. The system of claim 37 wherein the plastic material is a filled plastic material.

39. The system of claim 25 wherein the first recessed land area and the second recessed land area prevent a conductive flat-bottomed container from shorting the first spring contact and the second spring contact.

40. The system of claim 25 wherein the first recessed land area and the second recessed land area prevent a metal beverage can from shorting the first spring contact and the second spring contact.

41. The system of claim 25 wherein the first contact is disposed in the center of the cup and the second contact is disposed concentric to the first contact, such that the first contact makes contact with the first spring contact and the second contact makes contact with the second spring contact independent of the angular orientation of the cup with respect to the cupholder.

42. The system of claim 25 wherein the cupholder is a stand-alone unit.

43. A beverage cup for electrically heating a beverage using an electrical current, the beverage cup comprising:

a cup for providing containment of the beverage;

an electrical heating element disposed in the cup, the electric heating element comprised of a polymeric PTC material, the electric heating element being mounted with an electrically isolated adhesive layer;

such that when the electrical current is applied to the electrical heating element, the polymeric PTC material radiates heat for heating the beverage until a cut-off temperature is reached.

* * * * *